(12) United States Patent
Eberle et al.

(10) Patent No.: US 6,669,066 B2
(45) Date of Patent: Dec. 30, 2003

(54) HOLDING DEVICE FOR A SPARE WHEEL OF A MOTOR VEHICLE

(75) Inventors: Wilfried Eberle, Ehingen (DE); Rüdiger Jahn, Leonberg (DE); Oliver Benirschke, Leonberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 118 days.

(21) Appl. No.: 09/983,760

(22) Filed: Oct. 25, 2001

(65) Prior Publication Data

US 2002/0056737 A1 May 16, 2002

(30) Foreign Application Priority Data

Oct. 25, 2000 (DE) ......................................... 100 52 733

(51) Int. Cl.⁷ ................................................ B60R 9/00
(52) U.S. Cl. ...................... 224/509; 224/282; 224/517; 224/518; 224/42.21; 224/553; 224/556; 224/557
(58) Field of Search ................................ 224/282, 509, 224/517, 518, 42.13, 42.21, 42.24, 42.28, 543, 553, 556, 557

(56) References Cited

U.S. PATENT DOCUMENTS

| | | | |
|---|---|---|---|
| 1,244,417 A | * | 10/1917 | Brosman ..................... 206/304 |
| 3,283,973 A | * | 11/1966 | Wargo ......................... 224/42.21 |
| 3,845,891 A | | 11/1974 | Becher |
| 4,019,664 A | * | 4/1977 | Weiler ......................... 224/42.24 |
| 4,042,157 A | * | 8/1977 | Weiler ......................... 224/42.21 |
| 4,771,926 A | * | 9/1988 | Anderson et al. ........ 224/42.13 |
| 4,869,409 A | * | 9/1989 | Wright ...................... 224/42.21 |
| 4,993,609 A | * | 2/1991 | Flint .......................... 224/42.2 |
| 5,094,374 A | * | 3/1992 | Lee ........................... 224/42.21 |
| 5,108,020 A | * | 4/1992 | Patrick et al. ............... 224/319 |
| 5,186,371 A | * | 2/1993 | Jozefczak et al. ........ 224/42.21 |
| 5,333,766 A | * | 8/1994 | Fisher ....................... 224/42.21 |
| 5,713,501 A | * | 2/1998 | Yokoyama et al. ......... 224/517 |
| 5,791,533 A | * | 8/1998 | Neag et al. ............... 224/42.21 |

FOREIGN PATENT DOCUMENTS

| | | |
|---|---|---|
| DE | 9104581.9 | 1/1992 |
| JP | 59032571 | 2/1984 |

* cited by examiner

Primary Examiner—Stephen K. Cronin
(74) Attorney, Agent, or Firm—Crowell & Moring LLP (57) ABSTRACT

A holding device for a spare wheel of a motor vehicle which is disposed on the outside of a swivellable rear hatch. The holding device includes a wheel carrier which is held by support arms and bearings on the vehicle body so as to swivel. The support arms are spaced apart and project from the wheel carrier and end sides thereof are connected to the bearings which are held on the vehicle body. These bearings form a vertical swivel axis which is arranged independently of a swivel axis of the rear hatch. The wheel carrier is capable of being swung about this vertical swivel axis up to the rear hatch and into a fixing position. In a release position, the holding device is capable of being swung away freely in relation to the rear hatch about the vertical swivel axis.

15 Claims, 8 Drawing Sheets

HOLDING DEVICE FOR A SPARE WHEEL OF A MOTOR VEHICLE

BACKGROUND AND SUMMARY OF THE INVENTION

This application claims the priority of German Patent Document 100 52 733, filed in Germany on Oct. 25, 2000, the disclosure of which is expressly incorporated by reference herein.

The invention relates to a holding device for a spare wheel of a motor vehicle.

U.S. Pat. No. 3,845,891 discloses a holding device for a spare wheel of a motor vehicle. The holding device is fastened externally on the rear of a motor vehicle body by way of spaced bearings which form a vertical swivel axis. The holding device can be swiveled from a fixing position into a release position so that there is the possibility of carrying out the swivel motion from the rear as far as up to the side wall.

The object of the invention is to provide an improved holding device for a spare wheel on the rear of the motor vehicle. The holding device can be released from a rear hatch and can be swiveled by itself alone in an optimal swivel range. The bearings of the holding device include components which are simple to assemble, can be retrofitted and can be disposed in the vehicle body so as to be largely covered.

The problem is solved, according to the invention, by providing support arms which are spaced apart and project from the wheel carrier and whose end sides thereof are connected to the bearings. The bearing are held on the vehicle body and form a vertical swivel axis which is arranged independently of a swivel axis of the rear hatch. The wheel carrier is swivellable about the swivel axis of the bearings up to the rear hatch into a fixing position and is held on a shock absorber cross member by way of a support member in a holding element and is freely swivellable from the rear hatch into a release position. Other advantageous features are disclosed in additional preferred embodiments.

The holding device for a spare wheel is provided on the rear hatch at the rear of the vehicle and has a holding device which comprises support arms which are spaced apart and project beyond the wheel carrier. The support arms are connected on the end side to bearings which are held on a motor vehicle body and form a vertical swivel axis. This vertical swivel axis is arranged independently of a swivel axis of the rear hatch so that the wheel carrier can be swiveled about this swivel axis up to the rear hatch into a fixing position and can assume a so-called release position in which the rear hatch can be swung up and down.

As a result of the design of the holding device having a vertical swivel axis which is disposed independently of the rear hatch, the rear hatch can be opened when the wheel carrier is swung away from the rear hatch about its vertical swivel axis. As a result, the rear hatch is not encumbered by the wheel carrier.

To guarantee the accommodation of the spare wheel, the wheel carrier comprises, for example, a so-called shell body, which is enveloped by a profiled frame and the support arms extend somewhat in extension of the top and bottom edge of the frame.

This design yields a stable wheel carrier, which can be disposed approximately in the center of the vehicle rear by way of the support arms which project beyond the shell body. The profiled frame can also comprise a tubular frame whereby the wheel carrier can also be made of something different than a shell body.

So that the swivel axis is arranged vertically on the vehicle, the upper bearing includes a bearing bracket with bolt boreholes forming the vertical swivel axis. The bearing bracket is covered in a side joint of the rear hatch in the vehicle body and is connected to a post of the vehicle body by way of a holding angle. The bolt boreholes run on the rear-sided exterior of the post. The holding angle can be fastened with its one attachment leg for the bearing bracket to an inside wall surface of the post and with its other holding leg to the outside wall surface of the post.

So that the bearing bracket can be covered in a joint between the vehicle post (D-post) and the rear hatch, the body post includes an insertion opening in order to dispose on the inside of the attachment leg of the holding angle. The connection of the bearing bracket to the holding angle is achieved in a simple manner in that the bearing bracket includes a projecting arm, which corresponds to the mounting bracket of the holding angle and to which a bearing segment exhibiting a U-shaped cross section is attached. This bearing segment includes bearing plates, which are vertically spaced and in which there are bolt boreholes, and whose rear side rests true to shape against the outer surface of the body post. To cover the bearing bracket, the post is enveloped by a cover element, which can be slid on and which includes an opening for the support arm and whose one rear-sided face rests sealingly against the outer wall surface of the post of the vehicle body.

The top bearing can be retrofitted in a simple manner in the vehicle or already provided during construction of the vehicle, whereby then only the holding angle is connected to the D-post of the vehicle body.

The bottom bearing comprises in essence a bearing bracket connected to the vehicle body and a hinge element mounted on the support arm. The bearing bracket includes a rear-sided mounting plate and adjacent bracket plates, which are spaced relative to each other, with bolt boreholes for the vertical swivel axis. Between the bracket plates an installable hinged lever is mounted on slide bushings of a hinge bolt so as to swivel. This bearing is largely covered by shock absorbers so that the actual vertical swivel axis is also covered. The support arm is connected to the hinge element and lies embedded in the fixing position in a cover.

The bottom and top bearing are designed in such a manner that prior to opening the rear hatch, the holding device is swung so far about a horizontal axis outwardly about the vertical axis until the rear hatch can move freely.

To facilitate the swivel motion in the direction of the fixing position and in the direction of the release position, the bottom bearing exhibits at least one pneumatic spring, which, on the one hand, is braced against the bearing bracket and, on the other hand, against the hinge element or is connected to the same. As a result of this arrangement of the pneumatic spring with a direction of effect outside the vertical swivel axes in the fixing and release position, a swivel motion into these two positions is facilitated, because in the fixing position of the wheel a maximum closing torque is achieved with a lever arm, and in the case of a swivel motion of the wheel carrier in the direction of the release position—after passing through a dead point position—a maximum swivel torque is also achieved.

In addition, the bottom bearing can also be secured at the stop element by way of a locking element in the end position of the release position. To this end, the end side of the hinge element exhibits a stop groove, with which a moveable locking element engages in the release position and which is designed so as to be unlockable in order to swivel the hinge element with the wheel carrier from the release position into the fixing position. The locking element comprises preferably a swivellable lever, whose free end engages with the stop groove. The lever is actuated preferably by way of a bolt, which can be actuated for the purpose of rotating.

To support and lock the holding device in the fixing position, a box-shaped holding element, into which a support member of the wheel carrier can be inserted so as to hold in the fixing position, is connected to a shock absorber cross member. The holding element has a rotary latch lock, which engages with a bolt of the support member. The rotary latch lock can be locked and unlocked by way of actuating means.

By way of this holding element, the holding device for the spare wheel is braced, on the one hand, against the vehicle and, on the other hand, held securely.

When the holding device is not being used, it can be unscrewed, by removing, for example, the hinge bolts or by unscrewing the bearing brackets.

Other objects, advantages and novel features of the present invention will become apparent from the following detailed description of the invention when considered in conjunction with the accompanying drawings.

DETAILED DESCRIPTION OF THE DRAWINGS

Figure 1:
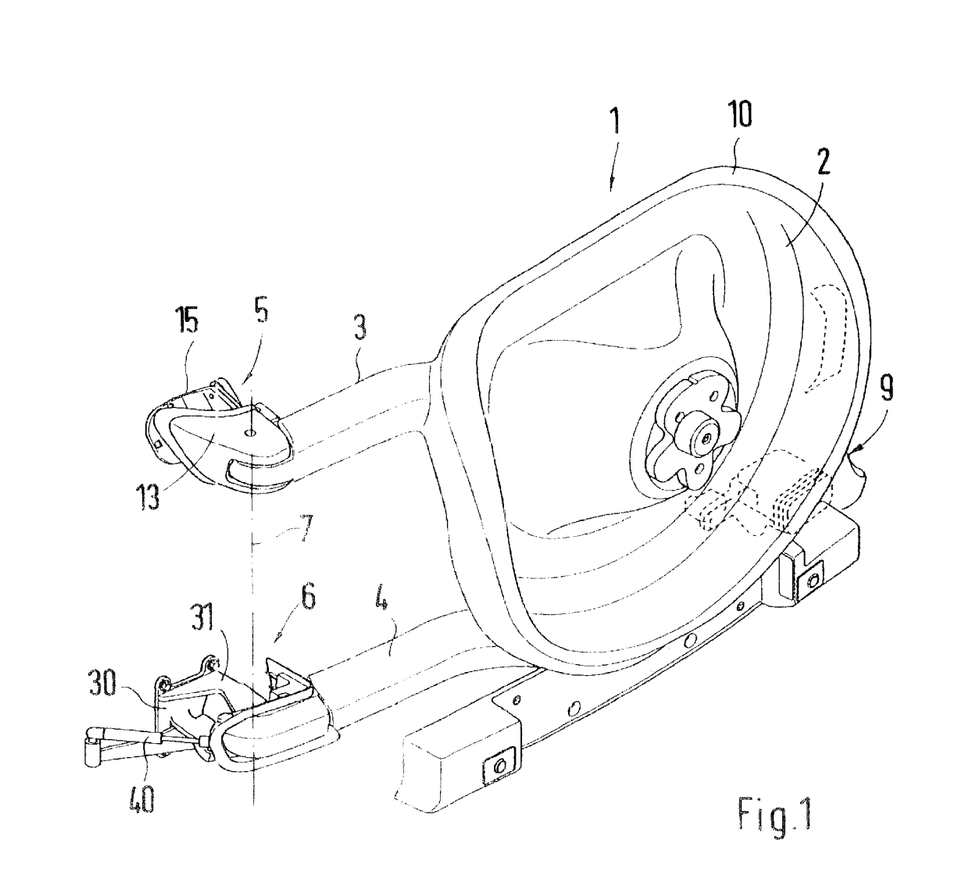
FIG. 1 is a schematic diagram of a holding device for a spare wheel.
Figure 10:
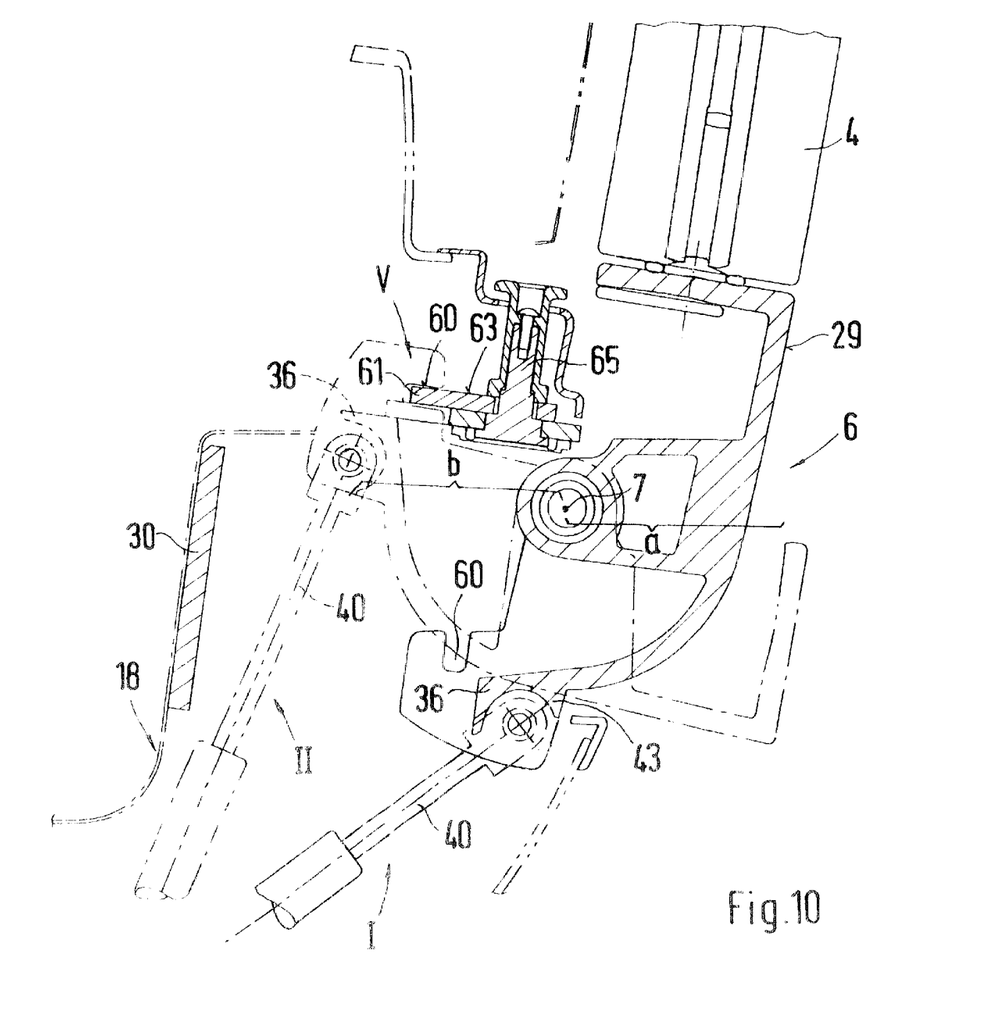
FIG. 10 is a horizontal view of the bottom bearing with the hinge element, in the solid lines in a fixing position, in the dashed lines in a release position.

The holding device 1 comprises a wheel carrier 2 with two projecting support arms 3, 4, which are spaced apart. On the end side of the support arm 3 there is a top bearing 5 and on the end side of the other support arm 4 there is a bottom bearing 6. These two bearings 5 and 6 form a vertical swivel axis 7, by way of which the holding device 1 is swung away from the vehicle rear into a fixing position I on the vehicle rear and into a release position II, as shown in FIG. 10. In the fixing position I, the holding device 1 is held in a supporting device 9 on the vehicle body.

The wheel carrier 2 comprises a shell-shaped part which receives the wheel and which is enveloped by a frame, for example a tubular frame 10, from which the support arms 3, 4 branch.

Figure 2:
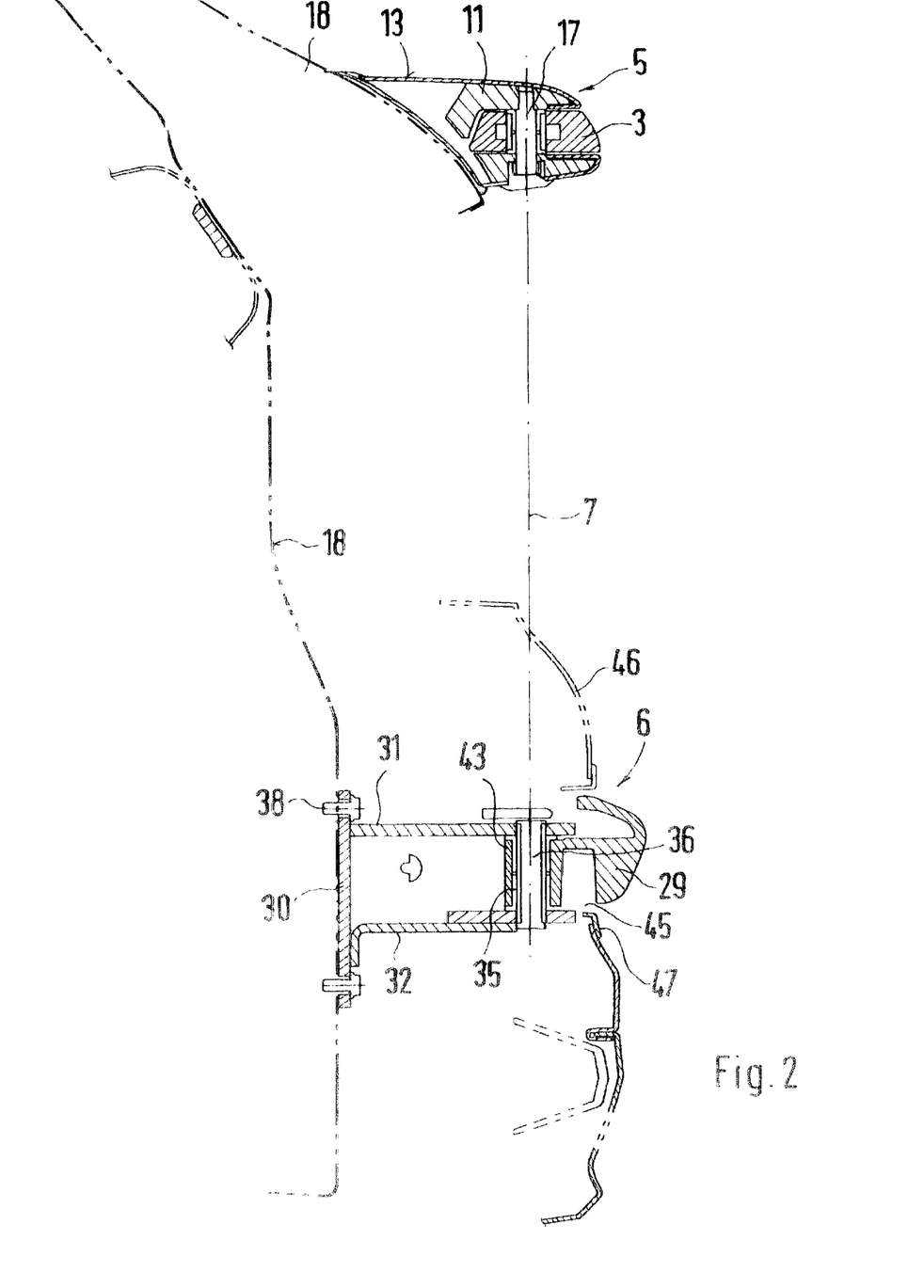
FIG. 2 is a vertical sectional view of a top and bottom bearing of the holding device.
Figures 3, 4:
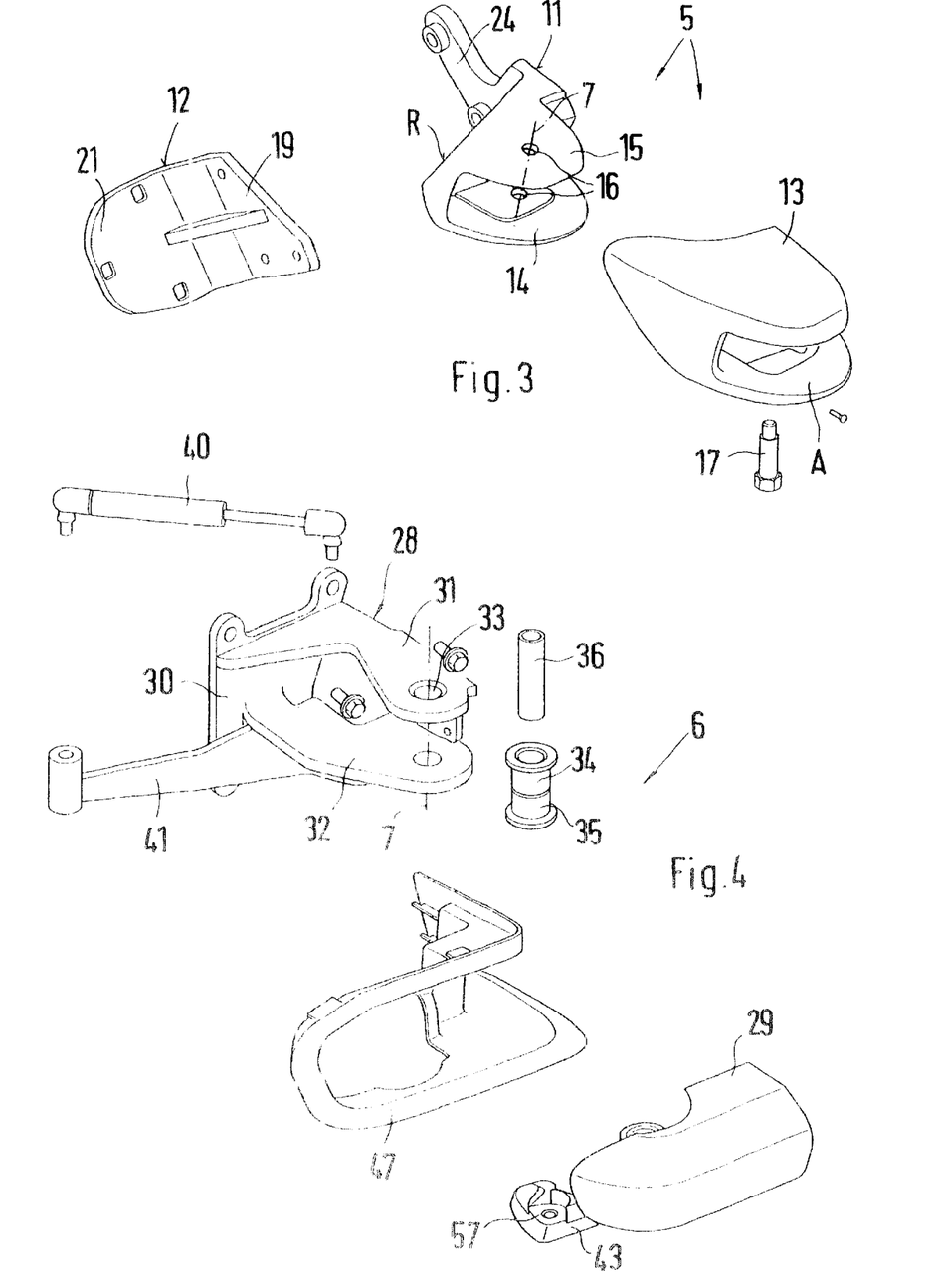
FIG. 3 depicts the top bearing with holding angle, bearing brackets and cover element.
FIG. 4 depicts the bottom bearing with bearing bracket, hinge element, cover and pneumatic spring.
Figure 5:
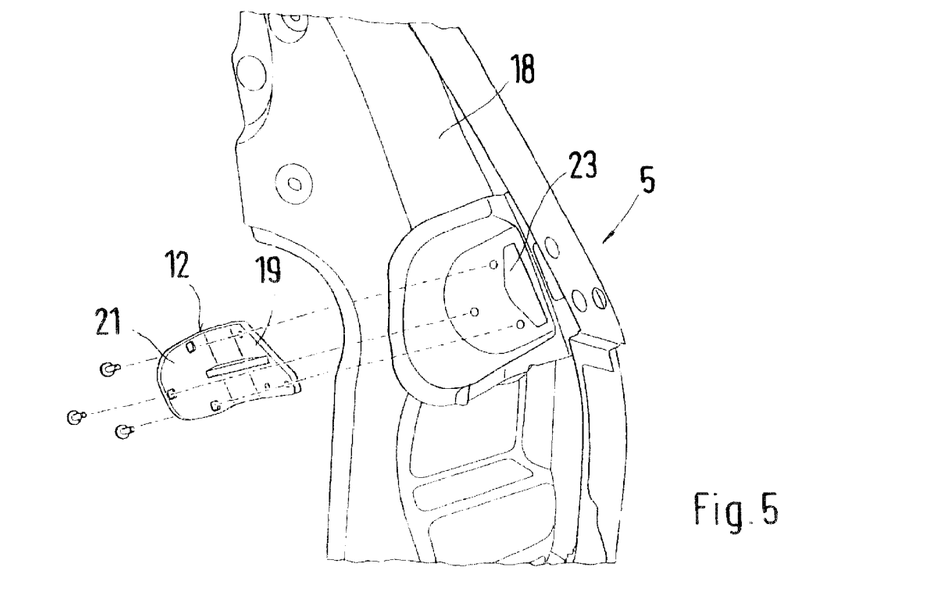
FIG. 5 is a schematic drawing of the D-post with holding angle.

The top bearing 5 comprises a bearing bracket 11, a holding angle 12 and a cover element 13. The bearing bracket 11 has two stacked bearing plates 14, 15 with boreholes 16 for a bearing bolt 17, for connection to the support arm 3. The holding angle 12 serves to fasten the bearing bracket 11 to a D-post 18 of the vehicle body. The angle is arranged with its one attachment leg 19 on an inside wall surface 20 of the D-post 18 and with its other holding leg 21 on an outside wall surface 22 of the D-post 18.

The bearing bolt 17 can also be designed as a joint, whereby then the bolt is provided with a ball, which is disposed between the correspondingly designed bearing shells. This ball joint is possible as another design, since in the case of a bolt hinge the weight of the holding device can cause displacements, which are avoided by way of the ball joint.

Figure 7:
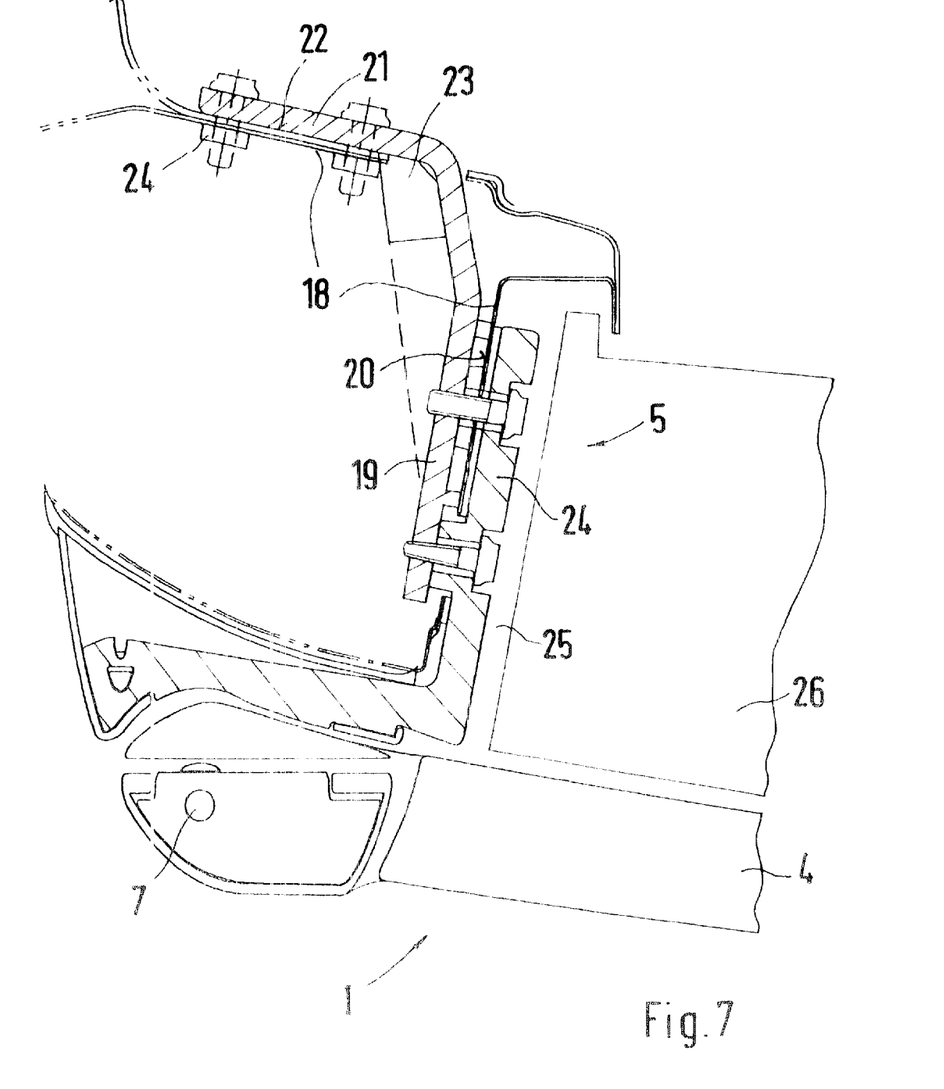
FIG. 7 is a horizontal view of the D-post in the area of the upper bearing of the holding angle and the bearing bracket.

The attachment leg 19 is pushed through an opening 23 in the D-post 18 and connected from the outside to a projecting arm 24 of the bearing bracket 11, whereby the holding angle 21 is connected directly to the wall of the D-post 18 by way of screws.

The projecting arm 24 of the bearing bracket 11 is provided in a side joint 25 between the rear hatch 26 and the D-post 18 of the vehicle body and thus largely covered and compact in an advantageous manner.

Figure 6:
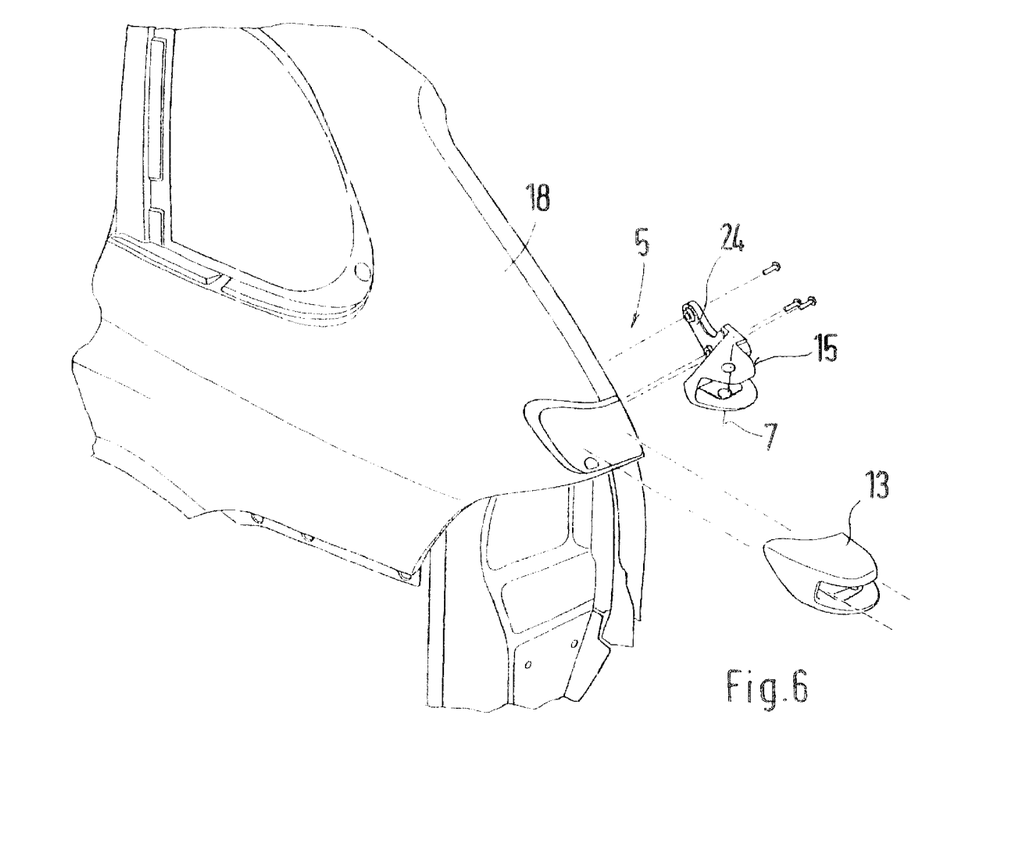
FIG. 6 is a schematic drawing of the D-post with bearing bracket and cover element.

As evident in FIG. 6 in the preassembled state and in FIG. 2 in the assembled state of the bearing 5, the bearing bracket 11 is enclosed by a cover element 13, which is designed so as to be slid on.

The bottom bearing 6 comprises preferably a bearing bracket 28, connected to the D-post 18 in the wall area 27, and a hinge element 29, fastened to the support arm 4. The hinge element 29 is connected to the bearing bracket 28 by way of bolts 36.

The bearing bracket 28 comprises bearing plates 31, 32, which are arranged on a back plate 30 so as to be spaced apart and the bearing plates 31, 32 are provided with bolt boreholes 33. Between the bearing plates 31, 32 a hinged lever 43 of the element 29 can be slid on a slide bushing 34, 35.

Figure 9:
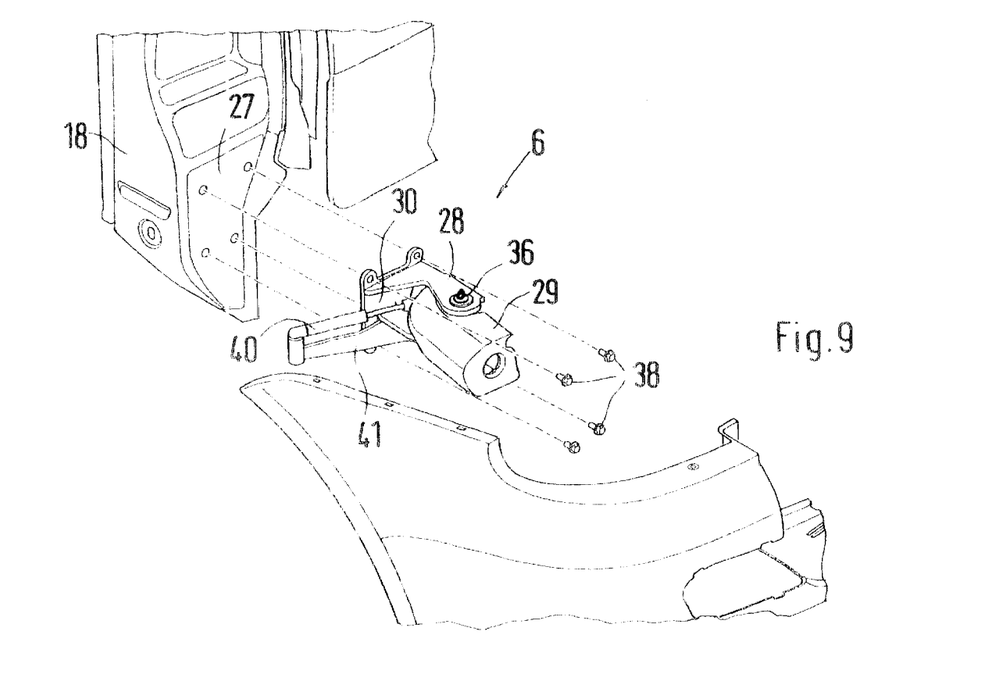
FIG. 9 depicts the bottom bearing with attachment to the D-post.

As shown in detail in FIG. 9, the back plate 30 is connected to the D-post 18 of the vehicle body by way of screws 38. Between the bearing bracket 28 and the hinge element 29 there is a pneumatic spring 40, which is hinged, on the one hand, to a projecting lever 41 of the bracket 28 and, on the other hand, to a downwardly projecting hinged lever 43 in a receptacle 47 of the hinge element 29. In the fixing position I and in the release position II, the pneumatic spring 40 exhibits a direction of effect, which is at distance a and distance b with respect to the vertical swivel axis 7. In this manner a supporting effect is achieved, on the one hand, in the end position of the fixing position I and in the end position of the release position II and, on the other hand, the result is that the force is supported when swiveling from one position to the other after passing through the dead point.

Figure 8:
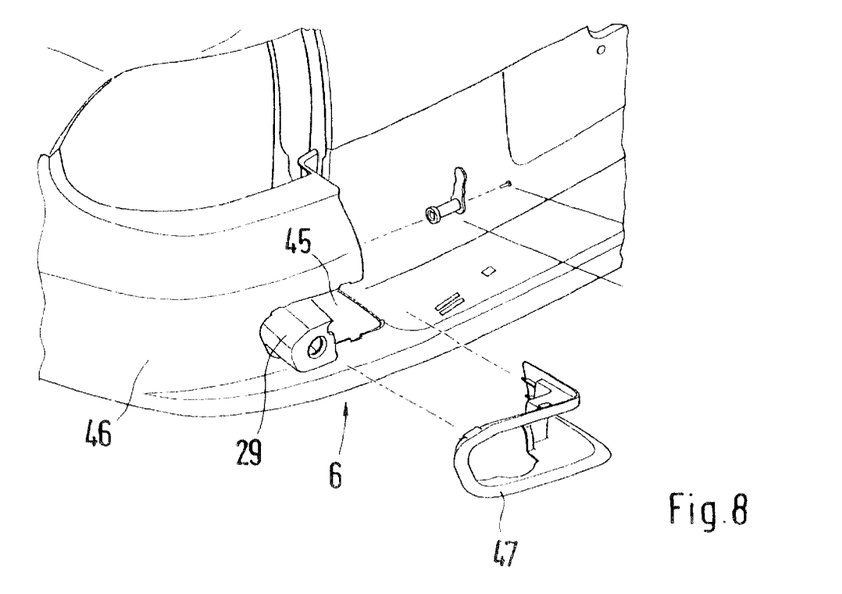
FIG. 8 is a view of the bottom bearing with visible hinge element of the bearing bracket and cover.

As depicted in detail in FIG. 8, the bottom bearing 6 is inserted into a cutout 45 of the shock absorber 46, which is covered by the receptacle 47, in which the hinge element 29 is embedded.

Figure 11:
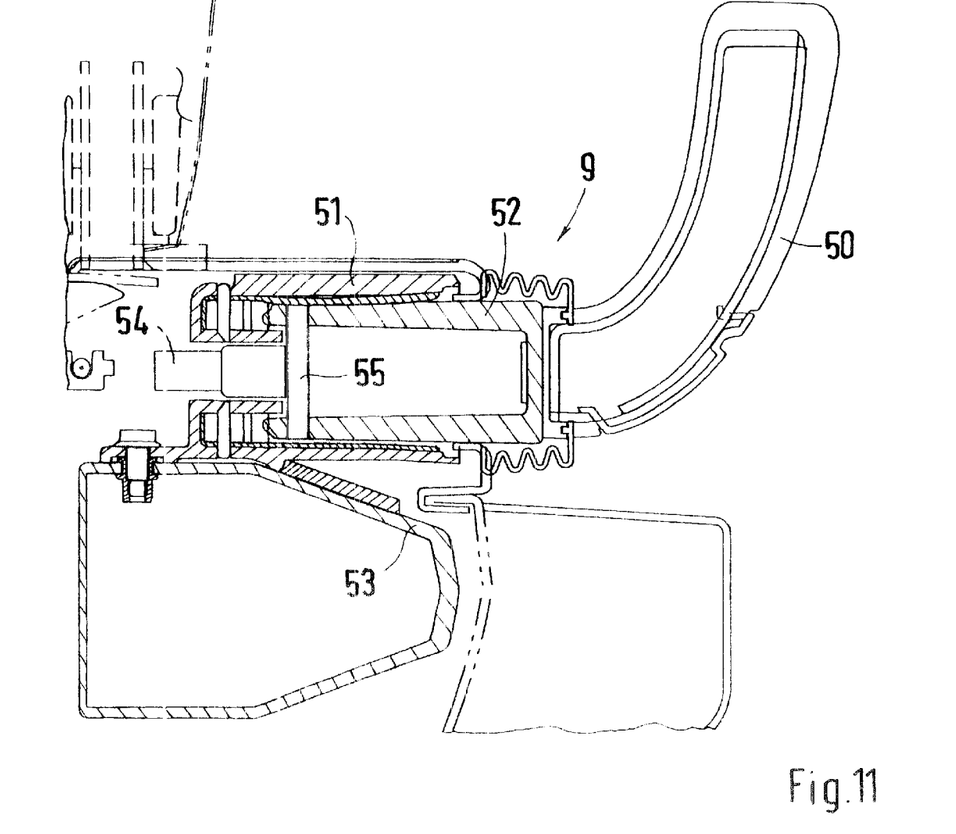
FIG. 11 is a horizontal view of a holding element with support member.
Figure 12:
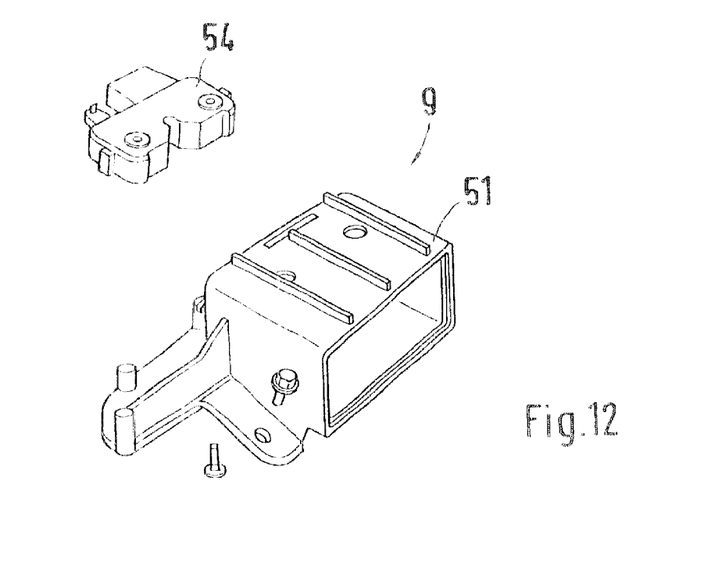
FIG. 12 depicts the holding element with rotary latch lock.

Opposite the support arms 3, 4 there is a projecting arm 50 (FIG. 11) on the frame 9 of the wheel carrier 2. The arm 50 is held in position in a box-shaped holding element 51 by way of a support element 52 which is fastened to the support arm 4. This holding element 51 is connected to a shock absorber cross member 53. To stop the inserted support member 52 there is, for example, a rotary latch lock 54, which holds securely a bolt 55 of the support member 52 in the fixing position I. With the actuating mechanism it is possible to unlock.

Moreover, to secure the holding device 1 in the release position II, that is in the swung up position in relation to the free swinging of the rear hatch, there is a locking element V, which engages with the stop groove 60 of the hinge element 29. The locking element V comprises preferably a lever 61 on a rotatable bolt 65 (FIG. 10). To release the lever 61, the bolt 65 can be swiveled out of the stop groove 60 so that the holding device 1 can be swung back out of the release position II into the fixing position I.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Holding device for a spare wheel of a motor vehicle, said holding device being disposed on the outside of a swivellable rear hatch and comprising a wheel carrier which is held by at least two support arms and which is supported by way of bearings on the vehicle body so as to swivel, the support arms being spaced apart and projecting from the wheel carrier and end sides thereof being connected to the bearings, the bearings being held on the vehicle body and forming a vertical swivel axis which is arranged independently of a swivel axis of the rear hatch, the wheel carrier being swivellable about the swivel axis of the bearings up to the rear hatch into a fixing position and being held on a shock absorber cross member by way of a support member in a holding element and being freely swivellable from the rear hatch into a release position, wherein the wheel carrier comprises a shell body which is designed to receive the spare wheel and which is enveloped by a tubular frame, the support arms including a top support arm extending from a top edge of the frame and a bottom support arm extending from a bottom edge of the frame, wherein the wheel carrier includes a projecting arm which extends in a direction opposite to the bottom support arm, and wherein the support member is held on the projecting arm.

2. Holding device for a spare wheel of a motor vehicle, said holding device being disposed on the outside of a swivellable rear hatch and comprising a wheel carrier which is held by at least two support arms and which is supported by way of bearings on the vehicle body so as to swivel, the support arms being spaced apart and projecting from the wheel carrier and end sides thereof being connected to the bearings, the bearings being held on the vehicle body and forming a vertical swivel axis which is arranged independently of a swivel axis of the rear hatch, the wheel carrier being swivellable about the swivel axis of the bearings up to the rear hatch into a fixing position and being held on a shock absorber cross member by way of a support member in a holding element and being freely swivellable from the rear hatch into a release position, wherein the bearings include a top bearing which comprises a bearing bracket with boreholes for the vertical swivel axis formed by way of a hinge bolt, the bearing bracket being arranged in a side joint of the rear hatch in the vehicle body and connected to a post of the vehicle body by way of a holding angle; and wherein the boreholes run on a rear-sided exterior of the post.

3. Holding device as claimed in claim 2, wherein the hinge bolt of the top bearing comprises a joint element which comprises a spherical segment on the bolt which is held in the corresponding bearing shells of the bearing bracket.

4. Holding device for a spare wheel of a motor vehicle, said holding device being disposed on the outside of a swivellable rear hatch and comprising a wheel carrier which is held by at least two support arms and which is supported by way of bearings on the vehicle body so as to swivel, the support arms being spaced apart and projecting from the wheel carrier and end sides thereof being connected to the bearings, the bearings being held on the vehicle body and forming a vertical swivel axis which is arranged independently of a swivel axis of the rear hatch, the wheel carrier being swivellable about the swivel axis of the bearings up to the rear hatch into a fixing position and being held on a shock absorber cross member by way of a support member in a holding element and being freely swivellable from the rear hatch into a release position, wherein a holding angle is attached with its one attachment leg for the bearing bracket to an inside wall surface of a post of the vehicle body and with its other holding leg to an outside wall surface of the post.

5. Holding device for a spare wheel of a motor vehicle, said holding device being disposed on the outside of a swivellable rear hatch and comprising a wheel carrier which is held by at least two support arms and which is supported by way of bearings on the vehicle body so as to swivel, the support arms being spaced apart and projecting from the wheel carrier and end sides thereof being connected to the bearings, the bearings being held on the vehicle body and forming a vertical swivel axis which is arranged independently of a swivel axis of the rear hatch, the wheel carrier being swivellable about the swivel axis of the bearings up to the rear hatch into a fixing position and being held on a shock absorber cross member by way of a support member in a holding element and being freely swivellable from the rear hatch into a release position, wherein the bearing bracket comprises a projecting arm which corresponds to an attachment leg of a holding angle and to which is attached a bearing segment having a U-shaped cross section and which comprises vertically spaced bearing plates having bolt boreholes, said bearing segment having a rear side which rests true to shape against an outer wall surface of a post of the vehicle body.

6. Holding device for a spare wheel of a motor vehicle, said holding device being disposed on the outside of a swivellable rear hatch and comprising a wheel carrier which is held by at least two support arms and which is supported by way of bearings on the vehicle body so as to swivel, the support arms being spaced apart and projecting from the wheel carrier and end sides thereof being connected to the bearings, the bearings being held on the vehicle body and forming a vertical swivel axis which is arranged independently of a swivel axis of the rear hatch, the wheel carrier being swivellable about the swivel axis of the bearings up to the rear hatch into a fixing position and being held on a shock absorber cross member by way of a support member in a holding element and being freely swivellable from the rear hatch into a release position, wherein a body post exhibits an insertion opening for internal arrangement of an attachment leg of a holding angle.

7. Holding device for a spare wheel of a motor vehicle, said holding device being disposed on the outside of a swivellable rear hatch and comprising a wheel carrier which is held by at least two support arms and which is supported by way of bearings on the vehicle body so as to swivel, the support arms being spaced apart and projecting from the wheel carrier and end sides thereof being connected to the bearings, the bearings being held on the vehicle body and forming a vertical swivel axis which is arranged independently of a swivel axis of the rear hatch, the wheel carrier being swivellable about the swivel axis of the bearings up to the rear hatch into a fixing position and being held on a shock absorber cross member by way of a support member in a holding element and being freely swivellable from the rear hatch into a release position, wherein a bearing bracket is enveloped by a cover element which is slidable thereon and which comprises an opening for one of the support arms and whose rear sided face rests sealingly on a wall surface of a post of the vehicle body.

8. Holding device for a spare wheel of a motor vehicle, said holding device being disposed on the outside of a swivellable rear hatch and comprising a wheel carrier which is held by at least two support arms and which is supported by way of bearings on the vehicle body so as to swivel, the support arms being spaced apart and projecting from the wheel carrier and end sides thereof being connected to the bearings, the bearings being held on the vehicle body and forming a vertical swivel axis which is arranged independently of a swivel axis of the rear hatch, the wheel carrier being swivellable about the swivel axis of the bearings up to the rear hatch into a fixing position and being held on a shock absorber cross member by way of a support member in a holding element and being freely swivellable from the rear hatch into a release position, wherein one of the bearings is a bottom bearing which comprises a bearing bracket connected to the vehicle body and a hinge element mounted on the support arm;

wherein the bearing bracket comprises a rear-sided mounting plate and adjacent bracket plates which are spaced relative to each other and have bolt boreholes for the vertical swivel axis; and wherein between the bracket plates an installable hinged lever is held on slide bushings of a hinge bolt so as to swivel.

9. Holding device as claimed in claim 8, wherein between the bearing bracket and the hinge element there is a pneumatic spring which is hinged, on the one hand, to a projecting lever of the bearing bracket and, on the other hand, to a hinged lever in a receptacle.

10. Holding device as claimed in claim 9, wherein in the fixing position of the wheel carrier the pneumatic spring exhibits with the lever arm (a) a maximum closing torque; and in the case of a swivel motion of the wheel carrier in the direction of the release position, after passing through a dead point position, a maximum swivel torque with the lever arm (b).

11. Holding device as claimed in claim 8, wherein an end side of the hinge element exhibits a stop groove with which a moveable locking element mates in the release position and which is designed so as to be unlockable in order to swivel the hinge element with the wheel carrier from the release position into the fixing position.

12. Holding device as claimed in claim 11, wherein the locking element comprises a swivellable lever arranged on a bolt and the lever being engaged with a free end with the stop groove.

13. Holding device for a spare wheel of a motor vehicle, said holding device being disposed on the outside of a swivellable rear hatch and comprising a wheel carrier which is held by at least two support arms and which is supported by way of bearings on the vehicle body so as to swivel, the support arms being spaced apart and projecting from the wheel carrier and end sides thereof being connected to the bearings, the bearings being held on the vehicle body and forming a vertical swivel axis which is arranged independently of a swivel axis of the rear hatch, the wheel carrier being swivellable about the swivel axis of the bearings up to the rear hatch into a fixing position and being held on a shock absorber cross member by way of a support member in a holding element and being freely swivellable from the rear hatch into a release position, wherein one of the bearings is a bottom bearing which is disposed in a cutout of the shock absorber, in which there is a cover and in which a hinge element which can be installed from the outside is embedded.

14. Holding device for a spare wheel of a motor vehicle, said holding device being disposed on the outside of a swivellable rear hatch and comprising a wheel carrier which is held by at least two support arms and which is supported by way of bearings on the vehicle body so as to swivel, the support arms being spaced apart and projecting from the wheel carrier and end sides thereof being connected to the bearings, the bearings being held on the vehicle body and forming a vertical swivel axis which is arranged independently of a swivel axis of the rear hatch, the wheel carrier being swivellable about the swivel axis of the bearings up to the rear hatch into a fixing position and being held on a shock absorber cross member by way of a support member in a holding element and being freely swivellable from the rear hatch into a release position, further comprising a box-shaped holding element into which the support member is insertable so as to hold the wheel carrier in the fixing position, wherein the box-shaped holding element is connected to the shock absorber cross member.

15. Holding device as claimed in claim 14, wherein the holding element has a rotary latch lock which engages with a bolt of the support member and is capable of being locked and unlocked by way of an actuating mechanism.

* * * * *